(No Model.)
W. A. VAN DEUSEN.
DEVICE FOR SPRAYING PLANTS.
No. 556,447. Patented Mar. 17, 1896.
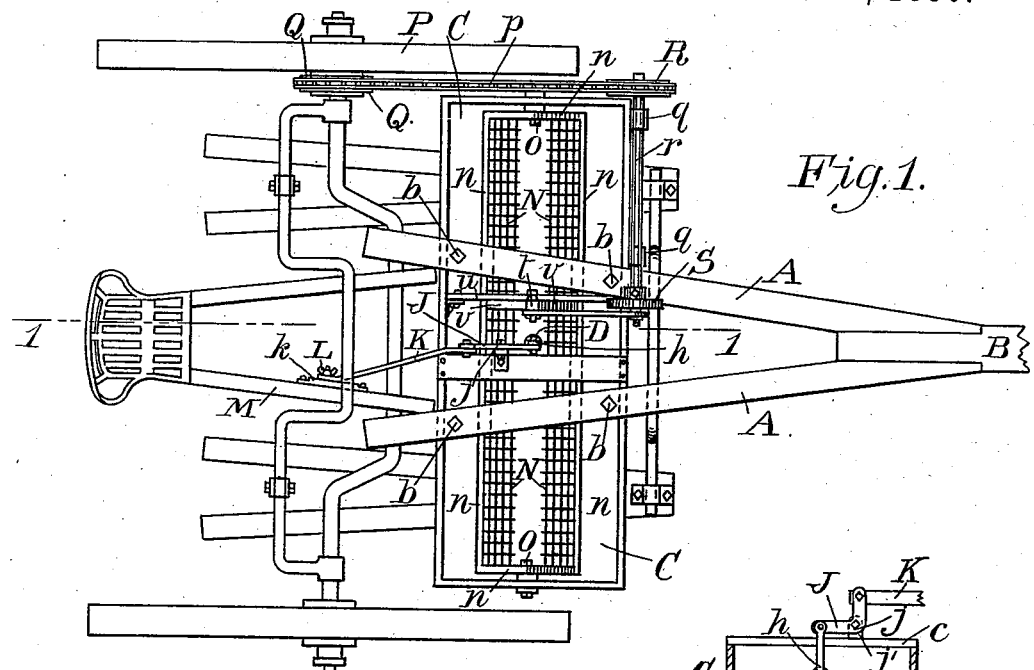
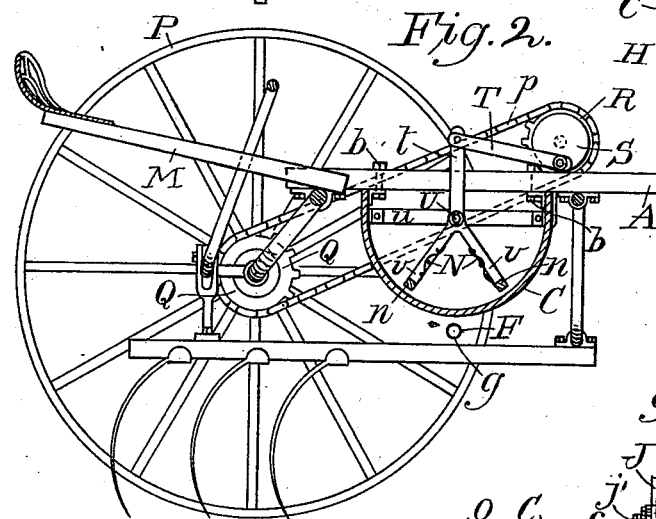
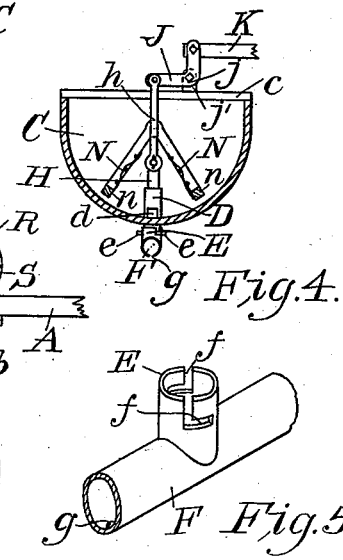
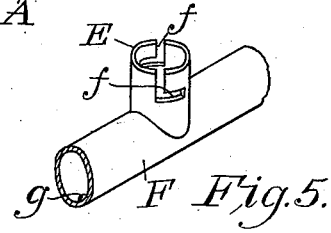
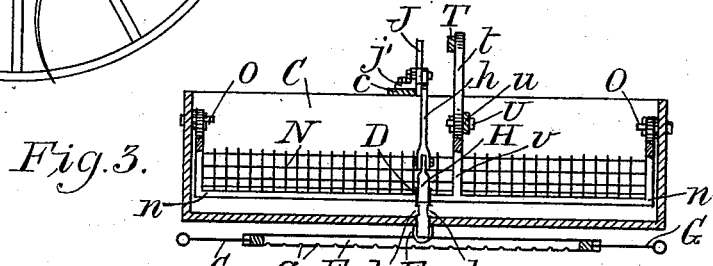
Witnesses:
J. W. Fisher
Grace T. Many
Inventor,
William A. Van Deusen.
by Ward & Cameron
Attorneys

UNITED STATES PATENT OFFICE.

WILLIAM A. VAN DEUSEN, OF SPROUT BROOK, NEW YORK.

DEVICE FOR SPRAYING PLANTS.

SPECIFICATION forming part of Letters Patent No. 556,447, dated March 17, 1896.

Application filed May 9, 1895. Serial No. 548,645. (No model.)

*To all whom it may concern:*

Be it known that I, WILLIAM A. VAN DEUSEN, a citizen of the United States, residing at Sprout Brook, county of Montgomery, State of New York, have invented a new and useful Device for Spraying Plants, of which the following is a specification.

My invention relates to improvements in agricultural implements; and the object of my invention is to produce an apparatus for spraying potato or other plants with paris-green solution in which the receptacle containing the solution may be placed on a cultivator and adjusted in such a manner that the flow of the liquid may be regulated by the operator both as to quantity and extent. I accomplish this object by means of the mechanism illustrated in the accompanying drawings, in which—

Figure 1 is a plan of a cultivator with my invention attached. Fig. 2 is a longitudinal section on line 1 1 on Fig. 1. Fig. 3 is a longitudinal vertical section through the hopper. Fig. 4 is a cross-section through my device, and Fig. 5 is a detail view of the sprayer.

Similar letters refer to similar parts throughout the several views.

To the frame A, supporting the pole B of a cultivator, I secure by means of suitable bolts $b\ b$, or in any convenient manner, a hopper C, which is preferably of the form shown in cross-section in Fig. 4, which is that of a trough with rounded bottom and which is usually about eighteen inches wide and extends the width of the cultivator—about four feet.

About midway between the ends of the hopper I place the short pipe D, which extends through the bottom of the hopper and is open at the bottom and has on each side of that portion of the pipe D which is within the hopper C and adjacent to the bottom of the hopper an opening $d$ connecting the interior of the pipe D with the interior of the hopper C and which allows for the discharge of the contents of the hopper.

On the sides of the pipe D, outside of the hopper C, I arrange the projecting pins or lugs $e\ e$, which fit in the right-angled groove $f$ in the projecting pipe E, connected to the central portion of the sprayer F and by means of which the pipe E is adjustably secured to the pipe D and communication established between the interior of the hopper and that of the sprayer. Along the surface of the sprayer F, I arrange a series of small openings $g$. In each end of the sprayer F, I place a piston G G in order that the extent of the discharge may be regulated, since by pushing the piston into the sprayer the discharge of liquid may be limited to those of the openings $g$ which are not cut off by the position of the pistons.

For the purpose of regulating the flow of liquid through the pipe D, I place therein a valve H secured by a link $h$ to the bell-crank lever J, which lever J is pivoted at $j$ to the standard $j'$, which is secured to the cross-piece $c$, said bell-crank lever J connected with the rod K, which has at its end a thumb-screw L, which engages with the slotted strip $k$, secured to the seat-support M of the cultivator, or in any other suitable part of the frame, by means of which the position of the valve may be regulated by the driver of the cultivator and retained in the position desired.

For the purpose of keeping the contents of the hopper mixed and preventing the deposit of solid substance in the bottom of the hopper I place therein an agitator, usually consisting of a wire-netting N N, secured at its ends and lower edges to suitable frames $n\ n$, said frames $n\ n$ at their ends secured by a bolt O O in such a manner that the frames $n\ n$ on each side of the hopper flare outward, as shown in Fig. 4.

For the purpose of imparting motion to the agitator I place on the hub of the wheel P a sprocket-wheel Q and connect it by a sprocket-chain $p$ with a sprocket-wheel R, which is mounted upon a spindle $r$, secured by suitable bearings $q$ to the side of the hopper C or in any suitable manner. The spindle $r$ also carries a crank-wheel S, in connection with which is the rod T attached to the arm $t$, which has flaring pieces $v$ secured to the frames $n\ n$.

I have shown a supporting-piece $u$ extending across the hopper in Fig. 2, to which the arm $t$ is pivoted at U. I do not limit myself to this construction, as any means for connecting the agitator so as to impart motion to the agitator will be within the scope of my invention.

The operation of my invention provides for the sprinkling of plants, especially potato plants, at the same time that they are being cultivated, and by being attached to the cultivator the discharge from the sprayer will insure the thorough treatment of the plants. It is usual to make a solution of paris-green and water in the cultivation of potatoes for the purpose of killing off the bugs on the vines, and it is desirable that the solution should be kept in motion in order that the paris-green will not deposit in the bottom of the hopper and clog the outlet. By means of my agitator a sufficient motion will be imparted to the contents of the hopper to keep it well mixed. By my adjustable sprayer it can be readily removed from the hopper and the contents of the hopper drawn off into a pail when desired, and by the pistons arranged at the ends of the sprayer the extent of the discharge therefrom may be regulated.

The whole apparatus may be quickly removed from the cultivator when desired, and, being extremely light, it is easy of adjustment.

What I claim as my invention, and desire to secure by Letters Patent, is—

In a mechanism for spraying plants a hopper, a discharge-orifice therein, a sprayer detachably secured to the lips of said discharge-orifice, a series of openings along the lower surface of said sprayer, a piston in the end of said sprayer adapted to regulate the discharge from said openings, a valve in said discharge-orifice, a bell-crank lever connected with said valve and suitably mounted, a means for retaining said bell-crank lever in any desired position, an agitator consisting of wire-netting mounted in two frames secured together along one edge and flaring outwardly, a cultivator on which said hopper is mounted, a sprocket-wheel on the hub of the cultivator-wheel, a sprocket-chain placed about said sprocket-wheel, a spindle mounted on the side of the hopper carrying a sprocket-wheel engaging with said chain, a crank-wheel on said spindle connected by suitable rods to the said agitator, all substantially described and for the purpose set forth.

WILLIAM A. VAN DEUSEN.

Witnesses:
E. T. VAN DEUSEN,
H. A. VAN DEUSEN.